(12) United States Patent
Pean et al.

(10) Patent No.: US 9,710,352 B2
(45) Date of Patent: Jul. 18, 2017

(54) MICROCONTROLLER WITH INTEGRATED MONITORING CAPABILITIES FOR NETWORK APPLICATIONS

(71) Applicant: Atmel Corporation, San Jose, CA (US)

(72) Inventors: Guillaume Pean, Aix en Provence (FR); Pierre Samat, La Ciotat (FR); Sebastien Younes, Pourrieres (FR)

(73) Assignee: Atmel Corporation, San Jose, CA (US)

( * ) Notice: Subject to any disclaimer, the term of this patent is extended or adjusted under 35 U.S.C. 154(b) by 668 days.

(21) Appl. No.: 13/630,026

(22) Filed: Sep. 28, 2012

(65) Prior Publication Data

US 2014/0095643 A1    Apr. 3, 2014

(51) Int. Cl.
*G06F 15/167*    (2006.01)
*G06F 11/34*    (2006.01)
*H04L 29/06*    (2006.01)

(52) U.S. Cl.
CPC ........ *G06F 11/349* (2013.01); *H04L 63/1425* (2013.01); *G06F 11/348* (2013.01)

(58) Field of Classification Search
CPC ........... H04L 43/04; H04L 67/22; H02H 3/20; H02H 7/09; H02H 9/005
USPC ............................. 709/224, 220; 455/456.1
See application file for complete search history.

(56) References Cited

U.S. PATENT DOCUMENTS

| | | | |
|---|---|---|---|
| 5,878,217 A * | 3/1999 | Cherukuri ..................... | 709/212 |
| 6,188,241 B1 * | 2/2001 | Gauthier et al. ................ | 326/41 |
| 8,495,699 B2 * | 7/2013 | White ............ | H04N 21/234318 |
| | | | 725/114 |
| 2003/0080677 A1 * | 5/2003 | Mikhael et al. .............. | 313/504 |
| 2004/0019730 A1 * | 1/2004 | Walker .................... | G06F 15/78 |
| | | | 710/306 |
| 2004/0139170 A1 * | 7/2004 | Shen et al. ..................... | 709/218 |
| 2007/0106884 A1 * | 5/2007 | Bracamontes ................ | 712/227 |
| 2013/0060929 A1 * | 3/2013 | Koponen ............ | H04L 12/4633 |
| | | | 709/224 |
| 2013/0080677 A1 * | 3/2013 | Simmons ............ | G06F 13/4068 |
| | | | 710/316 |

(Continued)

OTHER PUBLICATIONS

Koutroulis, E. ; Dept. of Electron. & Comput. Eng., Tech. Univ. of Crete, Chania, Greece ; Kalaitzakis, K. ; Voulgaris, N.C. , Development of a microcontroller-based, photovoltaic maximum power point tracking control system , Aug. 7, 2002, IEEE, Power Electronics, IEEE Transactions on (vol. 16 , Issue: 1 ), pp. 46-54.*

(Continued)

*Primary Examiner* — Tonia L Dollinger
*Assistant Examiner* — Dixon Dabipi
(74) *Attorney, Agent, or Firm* — Fish & Richardson P.C.

(57) ABSTRACT

A microcontroller has integrated monitoring capabilities for network applications. The disclosed techniques can take advantage, for example, of an unused, duplicate network controller that is present in some microcontrollers by providing selection circuitry and configuration capabilities that allow the unused, duplicate network controller to be used for the purpose of monitoring frames that are transferred between network media and another network controller residing on the microcontroller. The monitored frames can then be used, for example, for debugging or other purposes, such as statistical analyzes or security enhancements.

18 Claims, 2 Drawing Sheets

(56) References Cited

U.S. PATENT DOCUMENTS

2013/0090887 A1\* 4/2013 Deogharia ..... G01R 31/318555
   702/120

OTHER PUBLICATIONS

Kreuzinger, J. ; Dept. of Comput. Design & Fault Tolerance, Karlsruhe Univ., Germany ; Marston, R. ; Ungerer, T. ; Brinkschulte, U., The Komodo project: thread-based event handling supported by a multithreaded Java microcontroller, Sep. 8-Sep. 10, 1999, IEEE, EUROMICRO Conference, 1999. Proceedings. 25th (vol. 2 ), 122-128 vol. 2.\*

Atmel Corporation, "8/16-bit AVR XMEGA A3 Microcontroller," 8068T-AVR-12/10, pp. 1, 47 and 48 (Dec. 2010).

Atmel Studio-Atmel Corporation, "Two Architectures, One Studio," www.atmel.com/tools/atmelstudio.aspx, (Printed on Sep. 5, 2012).

\* cited by examiner

MICROCONTROLLER WITH INTEGRATED MONITORING CAPABILITIES FOR NETWORK APPLICATIONS

FIELD OF THE DISCLOSURE

This disclosure relates to a microcontroller with integrated monitoring capabilities for network applications. The monitoring capabilities can be used, for example, for debugging or other purposes, such as statistical analyses or security enhancements.

BACKGROUND

With the increasing use of microcontrollers using various communication protocol standards (e.g., USART, TWI, LIN), the demand for easy-to-implement solutions has increased. Developing an application using interconnected devices often necessitates a significant effort to identify and remove errors from computer hardware or software, a process sometimes referred to as "debugging." However, when developing applications using networking with microcontrollers, application debugging can be challenging. For example, when building a network that includes multiple devices communicating with one another, it may be difficult to locate the root cause of an issue when setting up the application.

To facilitate debugging, various devices dedicated to logging and analyzing network activity are available. For example, one approach for network application debugging is to use an external network analyzer connected to the network, as shown in FIG. 1.

SUMMARY

The present disclosure describes a microcontroller with integrated monitoring capabilities for network applications. The disclosed techniques can take advantage, for example, of an unused, duplicate network controller that is present in some microcontrollers by providing selection circuitry and configuration capabilities that allow the unused, duplicate network controller to be used for the purpose of monitoring frames that are transferred between network media and another network controller residing on the microcontroller. The monitored frames can then be used, for example, for debugging or other purposes, such as statistical analyses or security enhancements.

In one aspect, the disclosure describes a monolithic microcontroller system that includes a microprocessor, a system bus for coupling components of the microcontroller to one another, a first set of one or more input/output (I/O) terminals, and a different second set of one or more I/O terminals. The microcontroller system includes a first network controller operable for transferring and receiving information over the first set of one or more I/O terminals. A second network controller is operable in a first mode for transferring and receiving information over the second set of one or more I/O terminals, and is operable in a second mode for monitoring information transferred or received over the first set of one or more I/O terminals.

In some implementations, the microcontroller system further includes selection circuitry (e.g., a multiplexor) that is operable to couple the second network controller either to the first set of one or more I/O terminals or to the second set of one or more I/O terminals. For example, when the second network controller is configured in the first mode, the selection circuitry couples the second network controller to the first set of one or more I/O terminals, and when the second network is configured in the second mode, the selection circuitry couples the second network controller to the second set of one or more I/O terminals.

The second network controller can include an internal buffer for storing frames received by the second network controller when it is in the second mode, wherein the frames are transferred or received over the first set of one or more I/O terminals.

The disclosure also describes a method of operating a monolithic microcontroller. The method includes configuring a first network controller to operate either in a first mode for transferring frames to and from network media over a first set of one or more input/output (I/O) terminals or in a monitoring mode for logging network activity based on frames transferred between a second network controller and the network media over a second set of one or more I/O terminals. A state of selection circuitry is set to correspond to the mode in which the network controller is configured to operate. While the first network controller is configured in the monitoring mode, each frame that is transferred between the second network controller and the network media over the second set of one or more I/O terminals is saved in the first network controller.

The disclosed techniques can facilitate monitoring and debugging with respect to issues that may not be visible on the network media. Therefore, in some implementations, the techniques can provide a low-cost monitoring and debugging solution with enhanced capabilities.

Other aspects, features and advantages will be apparent from the following detailed description, the accompanying drawings, and the claims.

DETAILED DESCRIPTION

Figure 2:
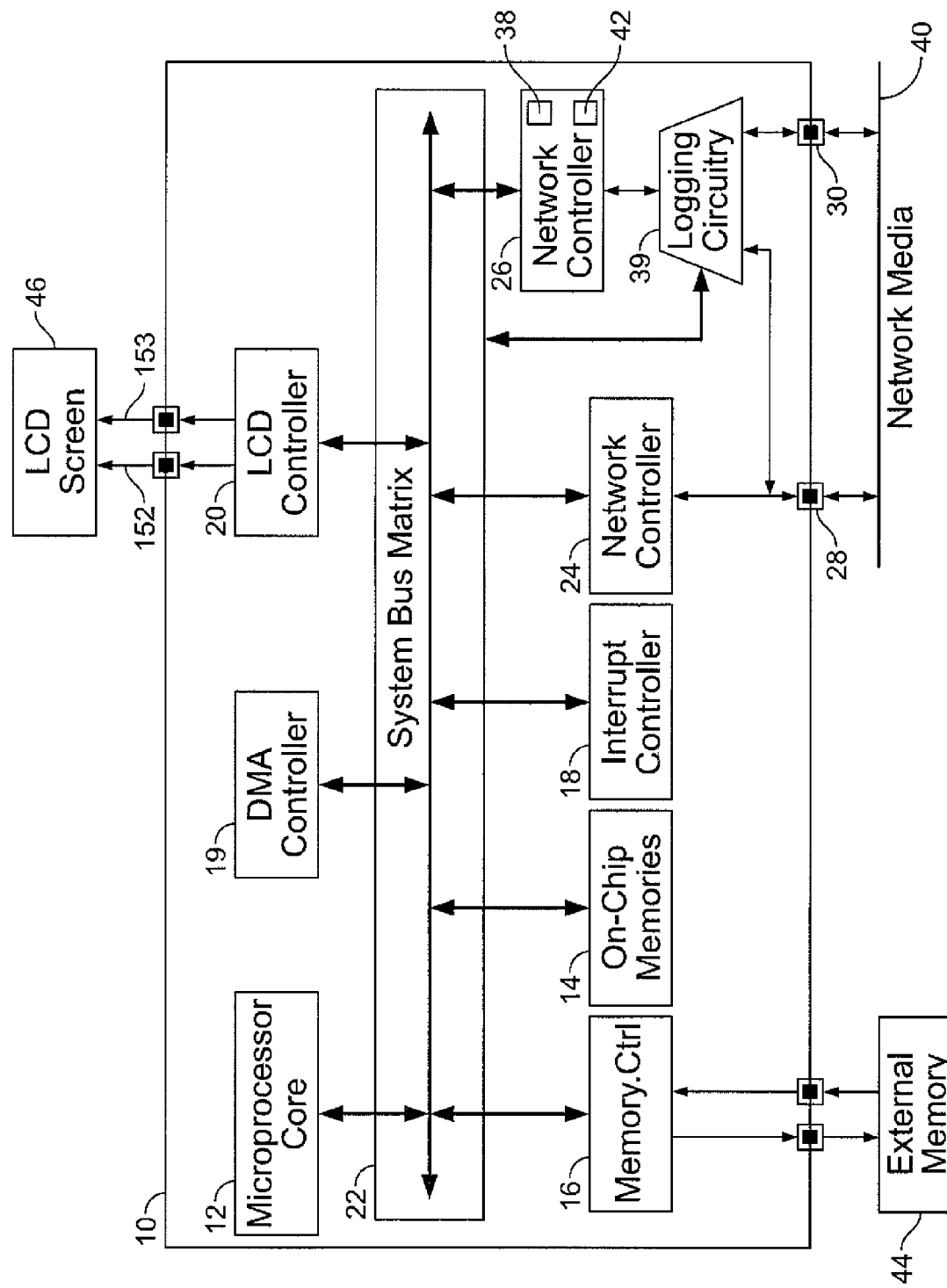
FIG. 2 illustrates an example of a microcontroller according to some implementations of the invention.

As illustrated in FIG. 2, a microcontroller 10 is implemented as a monolithic integrated circuit chip that includes a microprocessor core 12 and embedded on-chip memory devices 14 such as random access memory (RAM) and non-volatile flash memory. Microcontroller 10 may include various peripherals such as a memory controller 16 and an interrupt controller 18, as well as a direct memory access (DMA) controller 19 and a liquid crystal display (LCD) controller 20. Microcontroller 10 also can include various I/O terminals (e.g., I/O pads or pins) such as a clock terminal, a reset terminal and power terminals, as well as other I/O terminals discussed below. As illustrated in FIG. 2, microcontroller 10 also includes two or more network controllers 24, 26.

Microprocessor core 12 can execute user software that is loaded into on-chip memories 14, or that is stored in off-chip memory 44 and driven by memory controller 16. Off-chip memory devices tend to larger than on-chip memories in order to accept large amounts of data such as LCD images, user software that may comprise operating system, or applications such as a video player or web browser.

A system bus matrix 22 allows some of the modules (e.g., microprocessor core 12, DMA controller 19, and LCD controller 20) to serve as a master and be interconnected to another one of the modules (e.g., memory controller 16, on-chip memories 14, interrupt controller 19, or network controllers 24, 26) that serves as a slave. Microcontroller 10 can communicate with external components (e.g., a LCD screen 46, memory device 44 or network media 40) through interfaces such as LCD controller 20, memory controller 16 or network controllers 24, 26. I/O terminals (e.g., I/O pins or pads) are provided for driving (or to be driven by) the external components.

For example, network controllers 24, 26, can be coupled to network media 40 through input/output (I/O) terminals 28, 30. In the illustrated example, either one of network controllers 24, 26 can be used for transferring frames of information to and from microcontroller 10. Thus, first network controller 24 can transmit frames to, and receive frames from, network media 40 over I/O terminal 28. Frames received by way of I/O terminal 28 are handled by network controller 24. Likewise, when configured in a first mode, second network controller 26 can transmit frames to, and receive frames from, network media 40 over I/O terminal 30. Both network controllers 24, 26 can use the same data transfer protocol. In the example of FIG. 2, each network controller 24, 26 uses a single I/O terminal for transmitting and receiving frames. In other implementation, however, each network controller 24, 26 may use more than one I/O terminal to access the network media 40 (e.g., one terminal for receiving frames and one terminal for transmitting frames). Thus, some communication protocols may use two unidirectional data lines, whereas other protocols may use one or more bidirectional data lines.

Second network controller 26 can operate either in the first mode for transferring frames to and from network media 40 over I/O terminal 30, or in second mode, which may be referred to as a monitoring mode, in order to log network activity based on frames received by way of I/O terminal 28. In the illustrated example, second network controller 26 includes a register 38 that is activated by an instruction from microprocessor core 12 to place that network controller in the monitoring mode. On the other hand, when register 38 is deactivated, second network controller 26 operates in the first mode. Microcontroller 10 also includes selection circuitry 39, which selects whether a path is provided between second network controller 26 and I/O terminal 30, or between second network controller 26 and I/O terminal 28. Selection circuitry 39 can be implemented, for example, as a multiplexor. The state of selection circuitry 39 then can be set, for example, based on an instruction from microprocessor 12 or, in some implementations, by activating or deactivating a system register. Although selection circuitry 39 is shown as separate from network controller 26, in some implementations, selection circuitry 39 is integrated into network controller 26.

Figure 1:
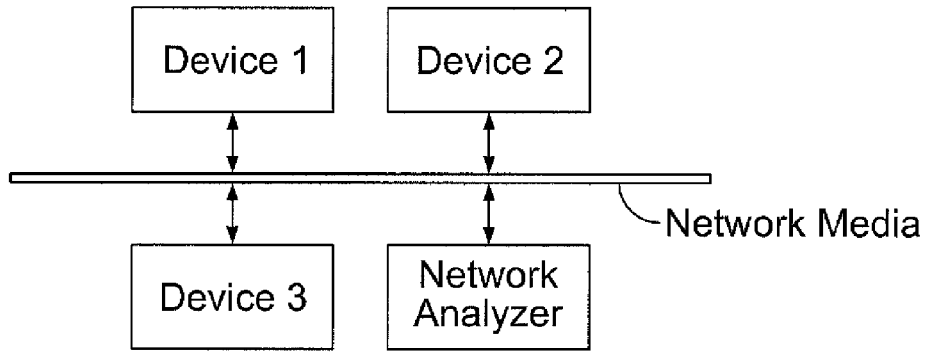
FIG. 1 illustrates a network analyzer connected to a network.
Figure 3:
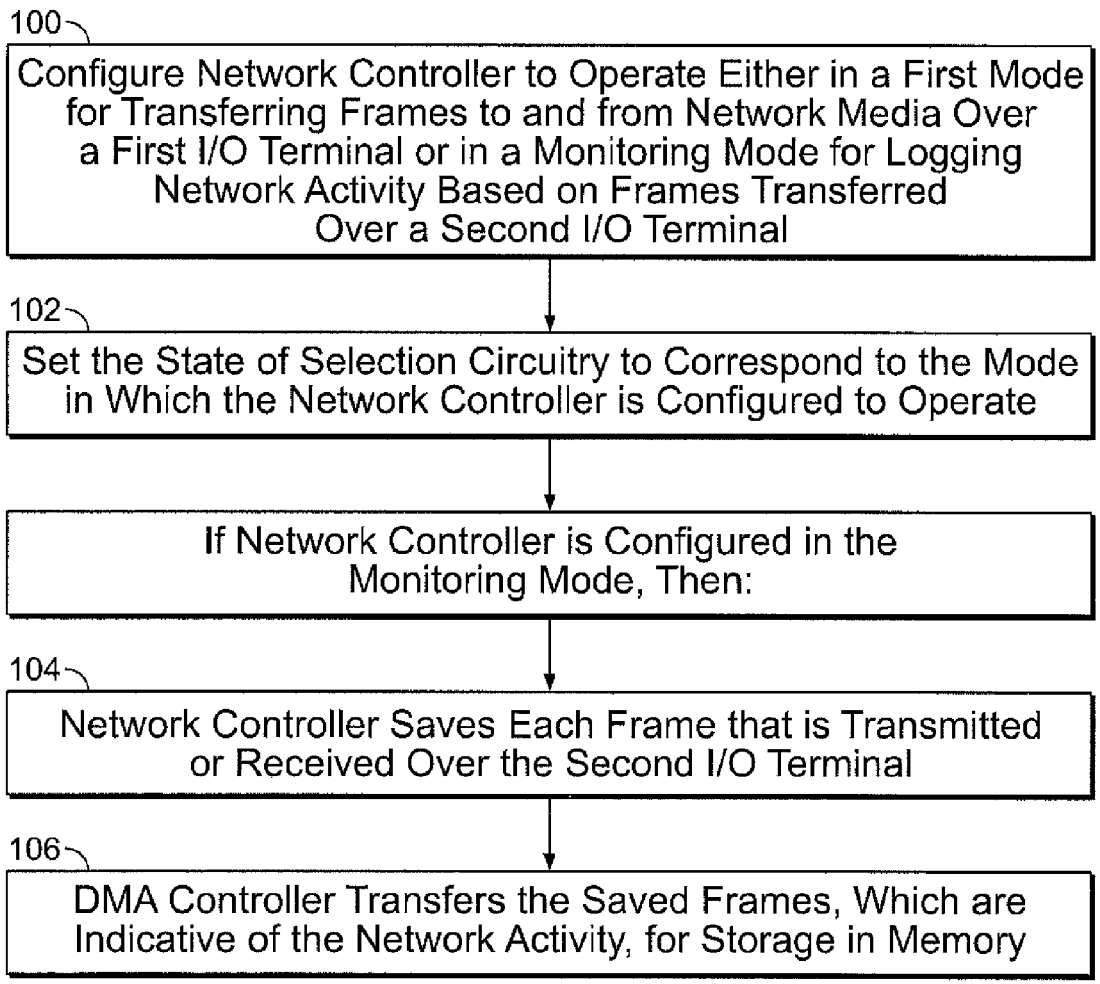
FIG. 3 is a flow chart illustrating various operations within the microcontroller.

FIG. 3 illustrates a method of operation of microcontroller 10. As shown in FIG. 3, second network controller 26 can be configured to operate either in a first mode for transferring frames to and from network media 40 over a first I/O terminal 30 or in a second (monitoring) mode for logging network activity based on frames transferred over a second I/O terminal 28 (block 100). In addition, the state of selection circuitry 39 can be set to correspond to the mode in which second network controller 26 is configured to operate (block 102).

When selection circuitry 39 is set to provide a path between second network controller 26 and I/O terminal 28, second network controller 26 will receive the same frames from network media 40 as first network controller 24. Assuming that second network controller 26 is configured to operate in the second (monitoring) mode, second network controller 26 saves each frame that is transmitted or received over I/O terminal 28 (block 104). Second network controller 26 can save the frames, for example, in its internal buffer 42. DMA controller 19 then can transfer the entire contents of internal buffer 42, which are indicative of the network activity, for storage in memory (block 106). In some cases, DMA 19 can perform the transfer without interrupting microprocessor core 12. In some implementations, DMA controller 19 transfers the contents of internal buffer 42 for storage in internal memory (e.g., on-chip memories 14). Alternatively, or in addition, DMA controller 19 can transfer the contents of internal buffer 42 for storage in external memory 44 via memory controller 16.

The foregoing microcontroller architecture facilitates parsing of network activity, thus enabling thus fast and efficient debugging capabilities. The illustrated technique can be advantageous, in some implementations, because no external circuitry is required to log and analyze the network activity. Furthermore, by employing an integrated solution in which the network monitoring capabilities are integrated within the microcontroller chip, it is possible to detect issues that are not visible on the network media 40. For example, in the case of a frame being missed as a result of a busy system, all the relevant information can be available in one location. Thus, information indicating that the device was busy at a particular time can be stored as well as information (based on the stored network activity log) indicating that, at the same time, a frame was sent, but not received.

Including network controller 26, which can be used for logging network activity, in microcontroller 10, can allow dynamic debugging and monitoring capabilities as well. For example, the final application can take advantage of the network activity log to detect a failure on the network or in the application, and use the information to detect unexpected or improper use.

The illustrated techniques can provide enhanced flexibility by allowing a network controller to provide the secondary function of monitoring network activity for subsequent use (e.g., debugging, statistical analysis, security checking).

Other implementations are within the scope of the claims.

What is claimed is:
1. A monolithic microcontroller system comprising:
 a microprocessor executing instructions stored in one or more on-chip memory devices;
 a first set of one or more input/output (I/O) terminals and a different second set of one or more I/O terminals;
 a first network controller, wherein the microprocessor is configured to transfer and receive information over the first set of one or more I/O terminals using the first network controller;
 a second network controller, wherein the second network controller is different than the first network controller, and wherein the microprocessor is configured to transfer and receive information over the second set of one or more I/O terminals using a first mode of the second network controller and to monitor information transferred or received by the first network controller over the first set of one or more I/O terminals using a second mode of the second network controller, wherein monitoring information transferred or received by the first network controller comprises storing an indication of one more missed frames of information; and selection circuitry operable to couple the second network controller either to the first set of one or more I/O terminals or to the second set of one or more I/O terminals, wherein, when the second network controller is configured in the first mode, the selection circuitry establishes a first path from the second network controller to the second set of one or more I/O terminals and when the second network controller is configured in the second mode, the selection circuitry provides a second path from the second network controller to the first set of one or more I/O terminals, the second path bypassing the first network controller.

2. The monolithic microcontroller system of claim 1 wherein the second network controller includes an internal buffer for storing frames received by the second network controller when it is in the second mode, wherein the frames are transferred or received over the first set of one or more I/O terminals.

3. The monolithic microcontroller system of claim 2 further including a DMA controller, wherein the DMA controller is operable to transfer contents of the buffer to memory.

4. The monolithic microcontroller system of claim 1 wherein the selection circuitry includes a multiplexor.

5. The monolithic microcontroller system of claim 1
wherein the selection circuitry is operable to couple the second network controller either to the first set of one or more I/O terminals or to the second set of one or more I/O terminals in response to an instruction from the microprocessor.

6. The monolithic microcontroller system of claim 1 further including a register, wherein the selection circuitry is operable to couple the second network controller either to the first set of one or more I/O terminals or to the second set of one or more I/O terminals in response to activation or deactivation of the register.

7. A microcontroller system comprising:
network media; and
a monolithic microcontroller comprising:
a microprocessor executing instructions stored in one or more on-chip memory devices;
a first set of one or more input/output (I/O) terminals coupled to the network media and a different second set of one or more I/O terminals coupled to the network media;
a first network controller, wherein the microprocessor is configured to transfer and receive frames over the first set of one or more I/O terminals using the first network controller;
a second network controller, wherein the second network controller is different than the first network controller, and wherein the microprocessor is configured to transfer and receive frames over the second set of one or more I/O terminals using a first mode of the second network controller and monitor frames passing over the first set of one or more I/O terminals between the first network controller and the network media using a second mode of the second network controller, wherein monitoring information transferred or received by the first network controller over the first set of one or more I/O terminals comprises storing an indication of one more missed frames of information; and selection circuitry operable to couple the second network controller either to the first set of one or more I/O terminals or to the second set of one or more I/O terminals, wherein, when the second network controller is configured in the first mode, the selection circuitry establishes a first path from the second network controller to the second set of one or more I/O terminals and when the second network controller is configured in the second mode, the selection circuitry establishes a second path from the second network controller to the first set of one or more I/O terminals, the second path not including the first network controller.

8. The microcontroller system of claim 7
wherein the monolithic microcontroller is operable to couple the second network controller either to the first set of one or more I/O terminals or to the second set of one or more I/O terminals in response to an instruction from the microprocessor.

9. The microcontroller system of claim 7 wherein the monolithic microcontroller further includes selection circuitry to couple the second network controller either to the first set of one or more I/O terminals or to the second set of one or more I/O terminals based on whether or not a specified register is activated.

10. The microcontroller system of claim 7 further including a multiplexor wherein, when the second network controller is configured in the first mode, the multiplexor provides a path between the second network controller and the second set of one or more I/O terminals and when the second network controller is configured in the second mode, the multiplexor provides a path between the second network controller and the first set of one or more I/O terminals.

11. The microcontroller system of claim 7 wherein the monolithic microcontroller includes memory for logging network activity based on frames received by the second network controller configured in the second mode, wherein the frames are transferred between the first network controller and the network media over the first set of one or more I/O terminals.

12. The microcontroller system of claim 7 wherein the monolithic microcontroller includes a DMA controller, wherein the DMA controller is operable to transfer information indicative of network activity, from the second network controller to memory.

13. A method of operating a monolithic microcontroller, the method comprising:
configuring a first network controller to operate either in a first mode for transferring frames to and from network media over a first set of one or more input/output (I/O) terminals or in a monitoring mode for logging network activity based on frames transferred between a second network controller and the network media over a second set of one or more I/O terminals, wherein the first network controller is different than the second network controller, and wherein logging network activity based on frames transferred between the second network controller and the network media comprises storing an indication of one more missed frames of information;
establishing a first path from the first network controller to the second set of one or more I/O terminals when the first network controller is configured in the monitoring mode, the first path not including the second network controller;

establishing a second path from the first network controller to the first set of one or more I/O terminals when the first network controller is configured in the first mode; and wherein, while the first network controller is configured in the monitoring mode, saving, in the first network controller, each frame that is transferred between the second network controller and the network media over the second set of one or more I/O terminals.

14. The method of claim 13 further including transferring the saved frames for storage in memory.

15. The method of claim 14 including transferring the saved frames for storage in memory embedded in the microcontroller.

16. The method of claim 14 including transferring the saved frames for storage in memory external to the microcontroller.

17. The method of claim 14 including using the frames in memory to debug an application.

18. The method of claim 14 including setting a state of a multiplexor to provide the first or second path.

* * * * *

UNITED STATES PATENT AND TRADEMARK OFFICE
CERTIFICATE OF CORRECTION

PATENT NO. : 9,710,352 B2  
APPLICATION NO. : 13/630026  
DATED : July 18, 2017  
INVENTOR(S) : Guillaume Pean, Pierre Samat and Sebastien Younes Page 1 of 1

It is certified that error appears in the above-identified patent and that said Letters Patent is hereby corrected as shown below:

In the Specification

Column 4, Line 67, after "one" insert -- or --;

Column 5, Line 66, after "one" insert -- or --;

Column 6, Line 61, after "one" insert -- or --.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*